United States Patent
Kutaragi et al.

(10) Patent No.: US 7,165,223 B2
(45) Date of Patent: Jan. 16, 2007

(54) INFORMATION PROCESSING SYSTEM, ENTERTAINMENT SYSTEM, STARTUP SCREEN DISPLAY METHOD AND INFORMATION RECORDING MEDIUM

(75) Inventors: Ken Kutaragi, Kanagawa (JP); Taizo Tsuruoka, Tokyo (JP)

(73) Assignee: Sony Computer Entertainment, Inc., Tokyo (JP)

( * ) Notice: Subject to any disclaimer, the term of this patent is extended or adjusted under 35 U.S.C. 154(b) by 651 days.

(21) Appl. No.: 09/797,426

(22) Filed: Mar. 1, 2001

(65) Prior Publication Data

US 2002/0122058 A1 Sep. 5, 2002

(51) Int. Cl.
*G06F 3/01* (2006.01)

(52) U.S. Cl. ............... 715/745; 715/747; 715/765; 715/848

(58) Field of Classification Search ............... 345/738, 345/705, 707, 709, 712, 718, 742, 757, 745, 345/766, 825; 715/744, 745, 746–747, 867, 715/765, 848; 463/1–47; 713/1, 2
See application file for complete search history.

(56) References Cited

U.S. PATENT DOCUMENTS

| | | | |
|---|---|---|---|
| 5,498,003 A | | 3/1996 | Gechter |
| 5,757,290 A | | 5/1998 | Watanabe et al. |
| 5,991,735 A | * | 11/1999 | Gerace .................... 705/10 |
| 6,101,601 A | * | 8/2000 | Matthews et al. ......... 713/2 |
| 6,173,445 B1 | * | 1/2001 | Robins et al. ............. 717/173 |
| 6,392,613 B1 | | 5/2002 | Goto |
| 6,645,070 B1 | * | 11/2003 | Lupo .......................... 463/9 |
| 6,708,203 B1 | * | 3/2004 | Makar et al. ............. 709/206 |
| 2001/0018673 A1 | * | 8/2001 | Goldband et al. .......... 705/27 |
| 2002/0073305 A1 | * | 6/2002 | Joseph et al. .............. 713/1 |
| 2002/0166127 A1 | * | 11/2002 | Hamano et al. ........... 725/105 |

FOREIGN PATENT DOCUMENTS

| | | |
|---|---|---|
| JP | 63-318979 | 12/1988 |
| JP | 06-236431 | 8/1994 |
| JP | 08-285619 | 11/1996 |
| JP | 09-182876 | 7/1997 |
| JP | 11-024677 | 1/1999 |
| JP | 11-235465 | 8/1999 |
| JP | 11-239670 | 9/1999 |
| WO | 99/62606 | 12/1999 |
| WO | 00/06271 | 2/2000 |

* cited by examiner

*Primary Examiner*—Ba Huynh
(74) *Attorney, Agent, or Firm*—Katten Muchin Rosenman LLP

(57) ABSTRACT

In an entertainment, or any other information processing system, in order to provide a startup screen that does not become boring even after being started up many times, image drawing data created based on accumulated historical data is displayed each time it is started up. The historical information includes the system startup time, the idle time during which no game is executed, the number of times an application is started, the identification number of an optical disk and the application startup time. The display data used in the creation of image drawing data includes the number of drawing objects displayed on the startup screen, their display positions, display colors and opacity and the like.

64 Claims, 10 Drawing Sheets

INFORMATION PROCESSING SYSTEM, ENTERTAINMENT SYSTEM, STARTUP SCREEN DISPLAY METHOD AND INFORMATION RECORDING MEDIUM

FIELD OF THE INVENTION

The present invention relates to an information processing system and an entertainment system that displays a startup screen upon startup, a method of displaying the startup screen, and an information recording medium that stores a program for implementing the method.

BACKGROUND OF THE INVENTION

Entertainment systems that execute game programs and the like along with personal computers and other information processing systems often display a predefined startup screen (a still image or a moving image) at the time of the initialization process, self-test process and other types of startup processing performed when the power is turned on, for the purpose of keeping the user from being aware of the wait time or to hide the display of the content of the startup processing.

However, the conventional startup screens have a problem in that they are predefined and monotonous and repeat many times, so they may become boring after the startup is repeated a number of times.

SUMMARY OF THE INVENTION

It is an object of the present invention to vary the content displayed on the startup screen and thus provide a method of displaying the startup screen that does not become boring even if the startup is performed many times. It is another object of the invention to provide an information processing system and an entertainment system that uses the above method to display a startup screen, and an information recording medium that stores a program for implementing the method.

In order to achieve the aforementioned objects, the present invention provides an information processing system and an entertainment system provided with a startup screen creation block that creates and displays image drawing data for a startup screen each time it is started, and also provides a method of displaying the startup screen, and a machine-readable information recording medium that holds a program for implementing the method.

In the present invention, the startup screen creation block preferably performs the creation of image drawing data based on accumulated historical information. The historical information may include, for example, the system startup time, the idle time during which no game is executed, the number of times an application is started, the identification number of an optical disk and the application startup time. Any one of these parameters may be used, and a combination of two or more parameters may also be used.

In addition, the display data calculated by the startup screen creation block, based on the historical information, may include, for example, the number of drawn objects to be displayed on the startup screen, their display positions, display colors and opacity. Any one of these parameters may be used, and a combination of two or more parameters may also be used.

It is noted that in the case where the startup screen creation block comprises means of calculating display data for drawn objects to be displayed on the startup screen based on the historical data, the drawn objects may be, for example, three-dimensional objects that move within the display screen.

In addition, when the startup screen creation block comprises means of calculating information for drawing the startup screen by adding a plurality of pieces of said historical data, each multiplied by a coefficient, the entertainment system preferably comprises a storage area for holding those coefficients in advance.

In the present invention, the storage medium in which the historical information is accumulated may be provided either inside or outside the entertainment system or information processing system. When the entertainment system or information processing system is provided with a communications controller, the historical information may be held on external storage media connected via this communications controller. In addition, when the entertainment system or information processing system is provided with a rewritable built-in internal storage media, the historical information may be held on the built-in internal storage media.

An entertainment system of the present invention comprises an operation controller; a startup screen, creator; a game execution block; a historical information storage block; at least a central processing unit, a storage system and an image controller provided with an image processing unit, wherein said central processing unit implements the content of said operation controller that controls the operation of the entire entertainment system, a startup screen creator that creates a startup screen and outputs image drawing data via said image controller, and a game execution block that executes a game program, by programs for each stored in said storage system, and said storage system further holds historical information in a historical information storage block, where this information is used at the time of creation of image drawing data for the startup screen by said startup screen creator.

An information processing system of the present invention comprises at least a central processing unit, a storage system and an image controller provided with an image processing unit, wherein said central processing unit implements the content of an operation controller that controls the operation of the entire system, and a startup screen creator that creates a startup screen and outputs image drawing data via said image controller, by programs for each stored in said storage system, and said storage system further holds historical information in a historical information storage block, where this information is used at the time of creation of image drawing data for the startup screen by said startup screen creator.

A startup screen display method of the present invention processes by a central processing unit information received from a storage system and displayed by a display device via an image controller provided with an image processing unit, the method comprising the steps of:

Implementing by said central processing unit the content of an operation controller that controls the operation of the entire system, and creating a startup screen creator, a startup screen and image drawing data, by programs for each stored in the storage system, and using historical information held in a historical information storage block of said storage system as information used at the time of creation of image drawing data for the startup screen by said startup screen creator, and thus displaying a startup screen via said image controller.

According to the present invention in the case in which information from a storage system is processed by the central processing unit to create a startup screen via an image controller provided with an image processing unit, an information storage medium serves as said storage system, wherein said information storage medium is recorded with the content of a program containing an operation controller that controls the operation of the entire system, and the content of a program containing a startup screen creator that creates a startup screen and outputs image drawing data.

BRIEF DESCRIPTION OF THE DRAWINGS

FIG. 9 is a flowchart showing the processing of the startup screen creation block of the embodiment; and.

DESCRIPTION OF THE PREFERRED EMBODIMENT

Here follows a description of an embodiment of the present invention made with reference to the figures of the drawings. It should be noted that the device configuration, processing procedures and the like illustrated in the description of the embodiment of this invention are no more than examples, and they in no way limit the present invention. In addition, while the following embodiment is described using an entertainment system as an example, it is applicable to any type of information processing system, not only entertainment systems, as long as the system is provided with a central processing unit (CPU) for performing the stipulated processing, a main memory, storage devices for saving historical information, and means of creating and outputting image data.

A. Hardware Configuration

Figure 1:
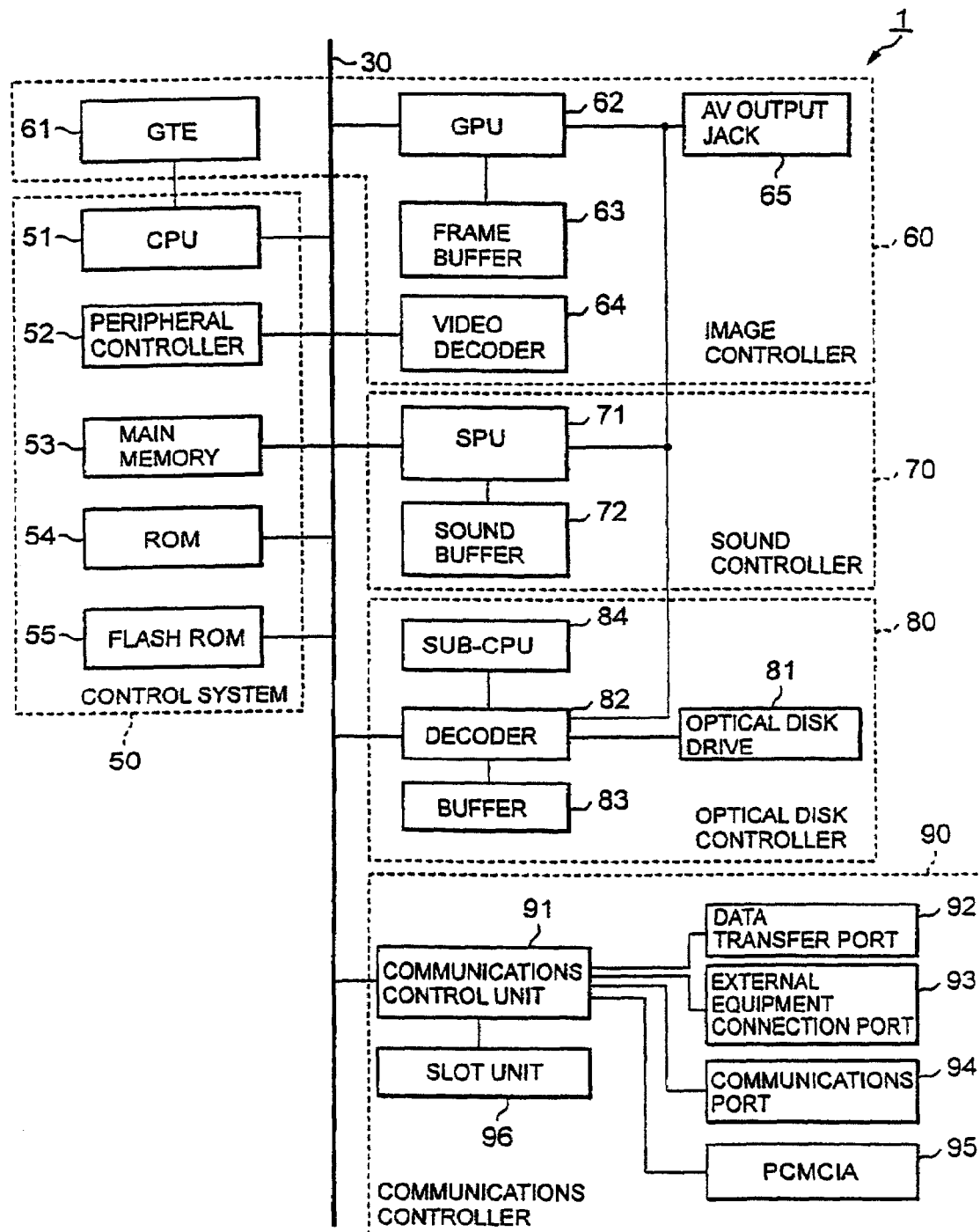
FIG. 1 is a block diagram showing the hardware configuration of an embodiment of the entertainment system of the present invention.

As shown in FIG. 1, the entertainment system 1 of the embodiment of the present invention includes, a control system 50 consisting of a CPU 51 along with its peripherals, an image controller 60 consisting of a graphic processing unit (GPU) 62 that draws images in a frame buffer 63 and the like, a sound controller 70 consisting of a sound processing unit (SPU) and the like for generating music, sound effects and the like, an optical storage device controller 80 that performs the reading of information from optical storage media, a communications controller 90 that controls the input/output of signals, a bus 30 that connects all of these components and a power supply unit (not shown) that supplies power to each of the components.

(1) Control System 50

The control system 50 includes the CPU 51, a peripheral controller 52 that performs control of direct memory access (DMA) transfers and the like, a main memory (main storage) 53 consisting of a random access memory (RAM), a ROM 54 which stores various programs and the like and a rewritable flash ROM 55.

The ROM 54 stores the so-called operating system (OS) which manages and controls the main memory 53, image controller 60, sound controller 70 and various other components, along with applications for executing games and various other programs. It is noted that the flash ROM 55 is a rewritable ROM, so it stores a portion of the data used by the OS and applications.

The CPU 51 is a device for executing programs read into main memory 53 from the ROM 54, flash ROM 55, optical disk drive 81 or the like. The CPU 51 executes the operating system program which is stored in advance in the ROM 54 and read into main memory 53 at the time of execution, thereby controlling the entire entertainment system 1.

In addition, the CPU 51 executes application programs read into the main memory 53, thereby executing games and various other applications. It is noted that the applications executed by the CPU 51 may be stored in advance on optical disks (CD-ROM, DVD-ROM (Digital Video Disk-Read Only Memory), etc.) and then read by the optical disk drive 81 and loaded into main memory 53, or they may be stored in advance in ROM 54 or flash ROM 55 and then read into main memory 53, or they may be accessed from outside via the communications controller 90 and loaded into main memory 53.

In addition, with the entertainment system 1 of the embodiment shown, the peripheral controller 52 that performs direct data transfers (so-called DMA transfers) among the main memory 53, GPU 62, a video decoder 64 and a decoder 82 without the CPU 51 is provided in the control system 50. Thereby, with the entertainment system 1 of this invention, it is possible to reduce the load on the CPU 51 and achieve high-speed data transfers. It is noted that this peripheral controller 52 also performs interrupt control.

(2) Image Controller 60

The image controller 60 includes: a geometry transfer engine (GTE) 61 that performs coordinate conversion and other processing, the GPU 62 that performs the drawing of images according to image drawing instructions from the CPU 51, the frame buffer 63 which stores images drawn by the GPU 62, the video decoder 64 which decodes encoded image data compressed by means of discrete cosine transforms and other orthogonal transforms, and an AV (audio-visual) output jack (namely, an audio-visual output terminal) 65.

The GTE 61 may be provided with a parallel processing mechanism whereby multiple operations may be executed in parallel, for example, being a device for performing coordinate conversions, light-source calculations, matrix or vector or other operations at high speed in response to operation requests from the CPU 51. By providing GTE 61, with the entertainment system 1 of this embodiment, the load on the CPU 51 is reduced and also it is possible to perform high-speed coordinate operations.

According to drawing instructions from the CPU 51, the GPU 62 generates polygonal shapes (polygons) and other types of image drawing data, stores this data in the frame buffer 63, and also outputs the image drawing data thus created to the AV output jack 65. The GPU 62 in this working example is able to perform flat shading wherein a triangular polygon is drawn with the same color, glow shading wherein the color within a polygon is determined by interpolation among the colors at the vertices of the polygon, texture mapping wherein a texture stored in a texture area is applied to a polygon, and is thus able to draw a maximum of roughly 75 million polygons per second.

The frame buffer 63 is a storage area for holding the data for the image to be displayed, and in embodiment, it consists of so-called dual-port RAM (Random Access Memory) that is able to perform reading out for display simultaneously with transfers from GPU 62 or main memory 53.

It is to be noted that the frame buffer 63 in this embodiment includes, in addition to the display image storage area for holding data for the display image, a CLUT area for storing a color look-up table (CLUT) that GPU 62 accesses at the time of drawing polygons and the like, and a texture area for storing raw material (textures) that are inserted (mapped) into polygons or the like, drawn by GPU 62 by means of coordinate conversion at the time of drawing. These CLUT and texture areas are dynamically updated as the display area is updated and the like.

Under control of the CPU 51, the video decoder 64 decodes still or video image data stored in main memory 53 and stores it in main memory 53. In addition, the image data thus regenerated can be stored in the frame buffer 63 via GPU 62 and thus used as the background for the aforementioned images drawn by GPU 62.

The AV output jack 65 is a terminal for outputting video signals, audio signals and various other signals to a TV monitor or other display device.

(3) Sound Controller 70

The sound controller (sound system) 70 includes a SPU 71 that, based on instructions from CPU 51, generates music, sound effects and the like and outputs same to the AV output jack 65, along with a sound buffer 72 that stores waveform data and the like.

The SPU 71 may be provided with, for example, an ADPCM decoding function for playing back 16-bit audio data encoded by Adaptive Differential Pulse Code Modulation (ADPCM) as 4-bit differential signals, a playback function for playing back waveforn data stored in the sound buffer 72, a modulation function for modulating and playing back waveform data stored in the sound buffer 72, and the like. For this reason, the sound system 70 can be used as a so-called sampling sound source that generates music, sound effects and the like based on waveforn data stored in the sound buffer 72 under instructions from CPU 51.

(4) Optical Disk Controller 80

The optical disk controller 80 includes: an optical disk drive 81 that reads programs and data and the like recorded on optical disk, a decoder 82 that decodes the programs and data and the like that may be recorded with error correction code (ECC) or the like added, and a buffer 83 that temporarily stores data from the optical disk drive 81 in order to increase the speed of reading of data from the optical disk. A sub-CPU 84 for arithmetic processing is connected to the decoder 82.

The optical disk drive 81 is a device for reading information (programs, audio data, image data, etc.) stored on a CD-ROM, DVD-ROM or other optical disk. The information read from the optical disk by the optical disk drive 81 is decoded by the decoder 82 and then transferred appropriately, depending on the type of information. For example, application programs are transferred to the main memory 53 or the like, audio sound data is subjected to digital/analog conversion or other processing by the SPU 71 if necessary and then transferred to the AV output jack 65, while AV sound data and video data is subjected to digital/analog conversion or other processing by the GPU 62 if necessary and then transferred to the AV output jack 65.

(5) Communications Controller 90

The communications controller 90 includes: a communications control unit 91 that controls communications with CPU 51 performed via the bus 30, various ports 92–94 and slots 95 and 96 for making electrical connections with the outside, The ports 92–94 and slots 95 and 96 are each electrically connected to the communications control unit 91.

The data transfer port 92 is a port for the transfer of data to and from the outside, being based on the IEEE (The Institute of Electrical and Electronics Engineers) 1394 standard in this embodiment. By connecting a digital camera, video deck or the like to this port 92 via a cable, it is possible to download images, sound or the like stored in these devices to the entertainment system 1.

The external equipment connection port 93 is a port for connecting a keyboard or other input device, a mouse or other pointing device, printer or other printing device, an external storage device that uses floppy disks, magneto-optical disks or other magnetic storage media or the like, being based on the USB (Universal Serial Bus) standard in this embodiment. In the entertainment system 1 of this working example, two of these external equipment connection ports 93 are provided.

The communications port 94 is a port for conducting communications with external equipment, being based on the IrDA (Infrared Data Association) standard which is a standard for data communications using infrared. The entertainment system 1 of this working example is able to exchange data with external equipment using infrared communications without connecting a cable or the like, as long as the external equipment has a port based on this same standard.

The PCMCIA slot 95 is a slot based on the PCMCIA (Personal Computer Memory Card International Association) standard which accepts modem cards and various other card-shaped peripherals. By inserting a modem card into this slot 95, the entertainment system 1 of this working example is able to conduct communications using the Internet or other public network.

The slot unit 96 includes: a controller connector (not shown) to which is connected a controller that receives control input from the user and which receives control input signals, and a memory card slot (not shown) into which is inserted a memory card which is an external auxiliary storage device for saving game settings, game progress and other data and which performs the input/output with the memory card. It is noted that with the entertainment system 1 of this embodiment, there are two each of the controller connectors and memory card slots. In addition, in this embodiment, a portable electronic device can be connected to the memory card slot as the external auxiliary storage device.

In order to receive control input from the user, the controller connected to the controller connector of the slot unit 96 may have 16 control keys, for example, and based on directions from the communications control unit 91, the state of these control keys is sent to the communications control unit 91 by means of synchronous communication roughly 60 times per second. The communications control unit 91 which receives this information, notifies the CPU 51 of the state of the control keys of the controller.

In addition, the CPU 51 performs the input/output of data to and from the external auxiliary storage device inserted in the memory card slot via the communications control unit 91. The external auxiliary storage device is provided with storage area for storing data that indicates the game progress and settings, for example. It is noted that the communications control unit 91 in this embodiment has built-in protection circuits to prevent electrical damage. The external auxiliary storage device consisting of a memory card or portable electronic device is separate from the bus 30 and can be inserted or withdrawn with the power on to the main system. Therefore, even in the event that the storage device must be replaced due to insufficient memory or another reason, these external auxiliary storage devices may be replaced without turning off the power to the main system.

B. Functional Configuration

Figure 2:
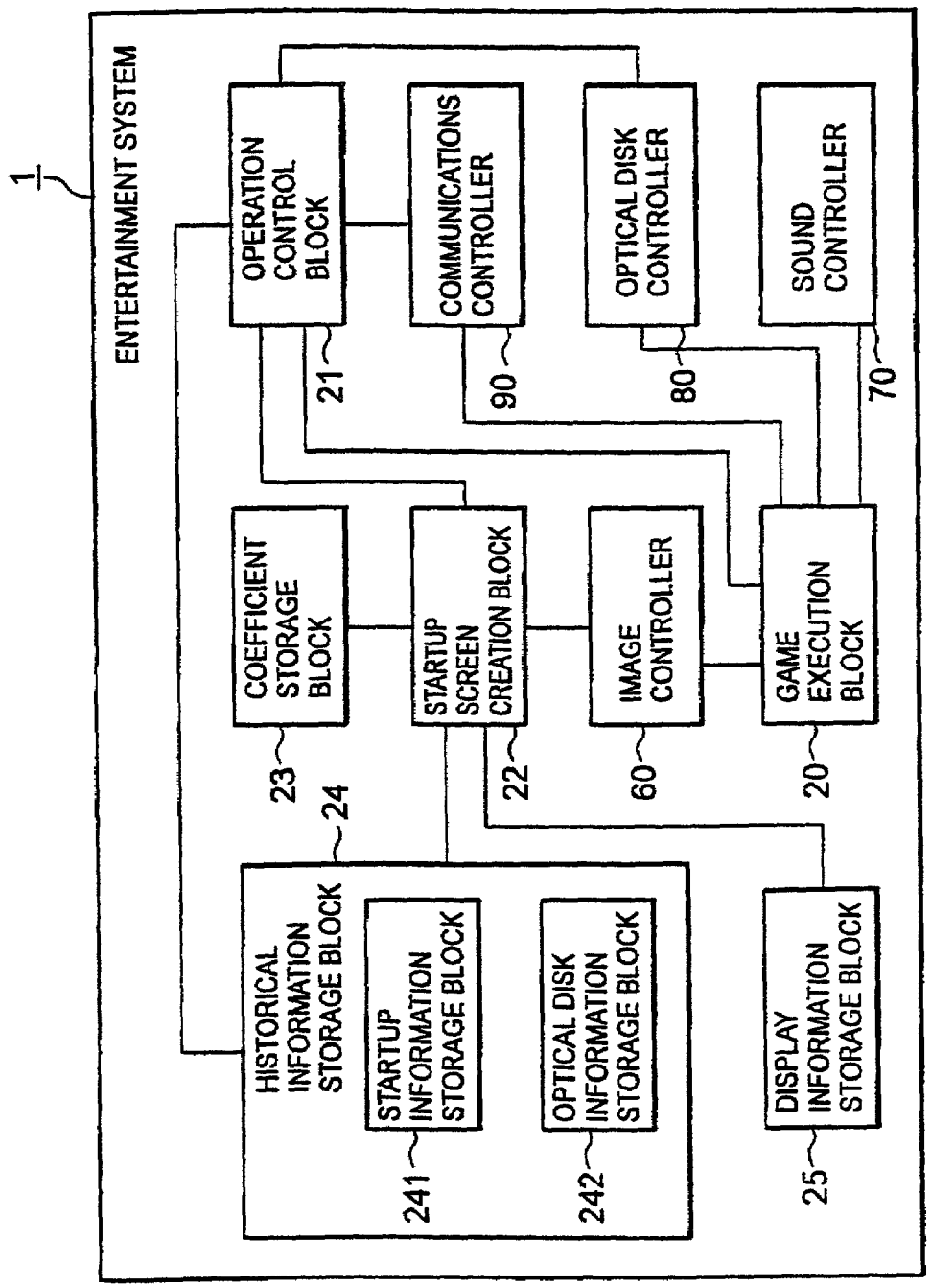
FIG. 2 is a block diagram showing the functional configuration of the entertainment system of the invention;.

As shown in FIG. 2, the entertainment system 1 of this embodiment includes: an operation control block 21 that controls the operation of the entire system, a startup screen creation block 22 that creates a startup screen and outputs image drawing data via the image controller 60, a game execution block 20 that executes game programs, a historical information storage block 24 for holding historical information, a coefficient storage block 23 that holds various coefficients for creating data for displaying the startup screen using historical information, a display information storage block 25 that holds data for displaying the startup screen, along with the image controller 60, sound controller 70, optical disk controller 80 and communications controller 90.

It is noted that in this embodiment, the game execution block 20, operation control block 21 and startup screen creation block 22 are held in the ROM 54 in advance, and implemented by the CPU 51 executing the program read into main memory 53, but the present invention is in no way limited by this method of implementation by software, but rather, it may be implemented by a hardware device that includes hardwired logic that executes the same steps.

In addition, in this embodiment, the information storage medium that holds the program for implementing the game execution block 20, operation control block 21 and startup screen creation block 22 is ROM 54, but the present invention is in no way limited to this. For example, the program may be held in flash ROM 55, on optical disk read by the optical disk drive 81, on a memory card or the like inserted into the slot unit 96, or on any other information recording medium that can be read by the control system 50.

C. Startup Screen Example

In this example, the startup screen is displayed as a moving image representing a three-dimensional space on the screen wherein floating cubes move from the back toward the front. The number of cubes displayed within the space, along with the display colors of the individual cubes, their brightness, movement speed and position in the depth direction (z coordinate) are each calculated using historical information.

It is noted that the present invention is in no way limited to the representation using such cubes as the display objects, but rather the objects subject to modification depending on the display contents and historical information, and the types of display data calculated using historical information may both be modified appropriately depending on the design. In addition, in this embodiment, the number of objects (cubes in this working example) is limited to a maximum of 80, but the maximum value of the number of objects displayed and the number displayed at one time can be modified appropriately depending on the size of the expected display screen, the capacity of the storage area and the like. In addition, the order of appearance is set in advance in this working example, but this may be determined based on some function, the order of appearance may be made random or it may be otherwise determined appropriately.

Figure 3A:
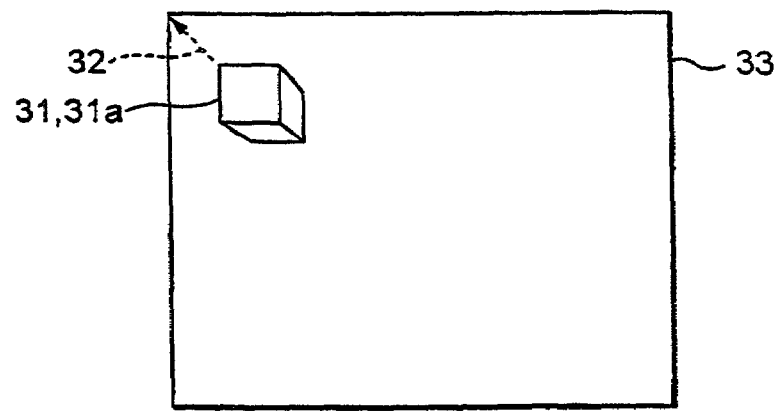
FIGS. 3A–3C show an explanatory diagram of an embodiment of a screen display example of a startup screen.
Figure 3B:
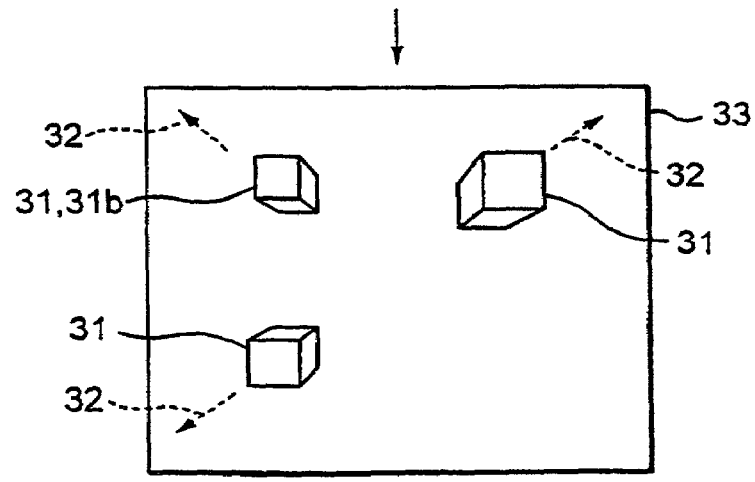
Figure 3C:
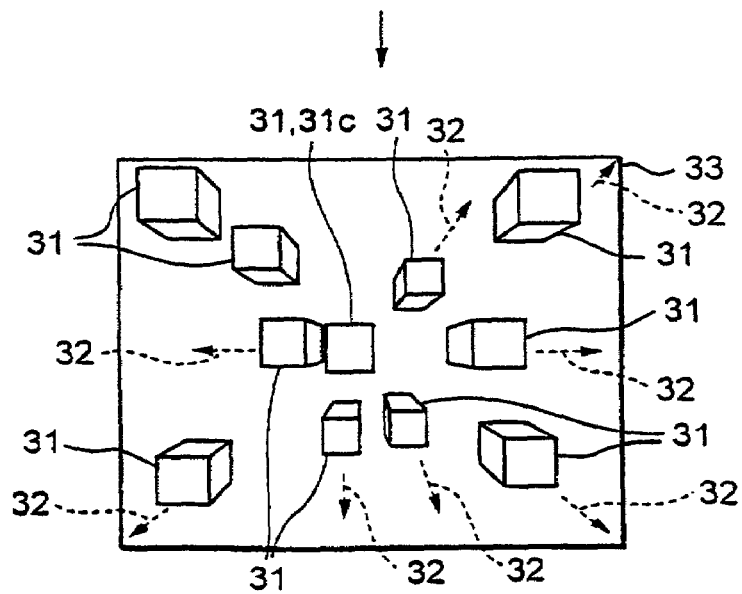

In this embodiment, in the initial state before no application has been started, the startup screen is represented by the state of a thin mist hanging over a dark three-dimensional space. When an application is started and historical information is collected, the next time it is started, as shown in FIG. 3A, a startup screen 33 in which a cube 31 moving toward the front is disposed within the space is displayed. It is noted that FIGS. 3A through 3C show the initial state of the startup screen (moving image), and the direction of movement of the cubes 31 is shown by the arrows 32. Note that a portion of the arrows showing the direction of movement are omitted to make the drawing easier to see.

While only one of the cubes 31 is displayed at first, as shown in FIG. 3A, as the historical information accumulates, the number of objects increases gradually as shown in FIGS. 3B and 3C, and the z-coordinates, colors, opacity and movement speeds of the cubes 31 also change gradually. It is noted that in this working example, the specific way of changing differs for each of the cubes 31, but as historical information accumulates, their opacity drops (namely, becoming more opaque) and their brightness increases (namely, becoming whiter). In addition, the z-coordinates of the cubes 31 gradually move toward the back from the initial state. Namely, as is evident from the change in the display positions of the cubes $31a$ through $31c$ in FIGS. 3A through 3C, the initial positions of the cubes 31 gradually change toward the back as historical information accumulates until finally, they are disposed upon a predetermined plane at a fixed position in the depth (namely, the state in which the z-coordinate is 0).

D. Data Structures

In this embodiment, the coefficient storage block 23, historical information storage block 24 and display information storage block 25 are defined to be storage areas provided in flash ROM 55. Some or all of these storage blocks may be held on memory cards or other storage media. If these storage blocks 23–25 are provided upon such removable storage media, the startup screen can be changed by swapping the storage medium. Therefore, by swapping the storage medium for each individual operator, it is possible to obtain a startup screen unique to each operator. On the other hand, by providing a storage medium built into the entertainment system 1 as in this working example, it is possible to create the startup screen based on the historical information for the system 1 itself regardless of the operator or other external environment.

In the case where these storage blocks 23–25 are provided on removable storage media, if the storage blocks 23–25 are not detected on any of the storage media connected, it is preferable to display a predetermined screen. In addition, in the event that a plurality of the storage blocks 23–25 are present, it is possible to apply a priority order to the storage media and use the ones provided on the highest-priority storage medium, or use a combination of the storage blocks 23–25 on one or more storage media.

(1) Display Information Storage Block 25

Figure 4:
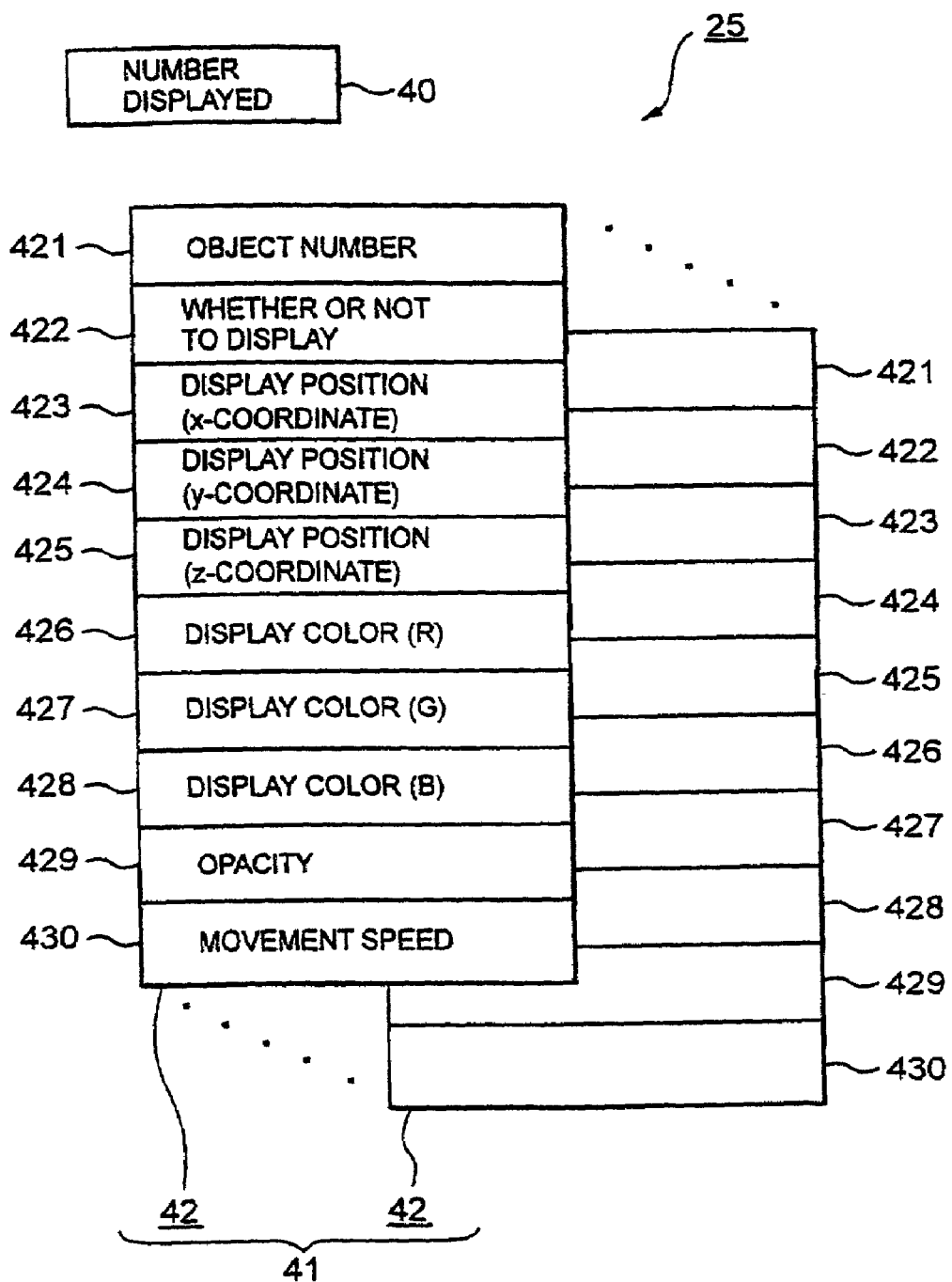
FIG. 4 is a schematic diagram showing an embodiment of the data structure of the display information storage block.

As shown in FIG. 4, the display information storage block 25 includes: a number displayed storage area 40 that holds the number of cubes (objects) 31 to be displayed (initial value of 0), and an object information storage area 42 that holds information for each of the cubes 31. In this embodiment, since the maximum number of cubes 31 displayed is 80, 80 object information storage areas 42 are provided in a group of object information storage areas 41.

The object information storage areas 42 each includes an object number storage area 421 for the object number which is an identifier attached to each of the cubes 31, a display identification code storage area 422 which indicates whether or not to display the object 31 in question, x-, y- and z-coordinate storage areas 423–425 for the display position, R (red), G (green) and B (blue) component storage areas 426–428 for the display color, a storage area 429 for the opacity and a movement speed storage area 430.

In this embodiment, the x-coordinate of the display position indicates the height direction in the three-dimensional space which is the field where the cubes 31 are displayed, while the y-coordinate indicates the horizontal direction and the z-coordinate indicates the depth direction with the z-coordinate at a stipulated depth from the front surface of the display screen set to 0. The x-coordinates and y-coordinates of the objects are set in advance so that if the objects were disposed in the same plane with a z-coordinate of 0, then the 80 objects (cubes) 31 would be disposed in a grid of eight vertically and ten horizontally, being stored in advance in the x-coordinate storage area 423 and y-coordinate storage area 424. In addition, the object number storage area 421 stores in advance numbers from 1 to 80 which are the identification numbers applied to the objects 31 in sequential order. The initial values of the other storage areas 422 and 425–430 are all 0.

(2) Coefficient Storage Block 23

Figure 5:
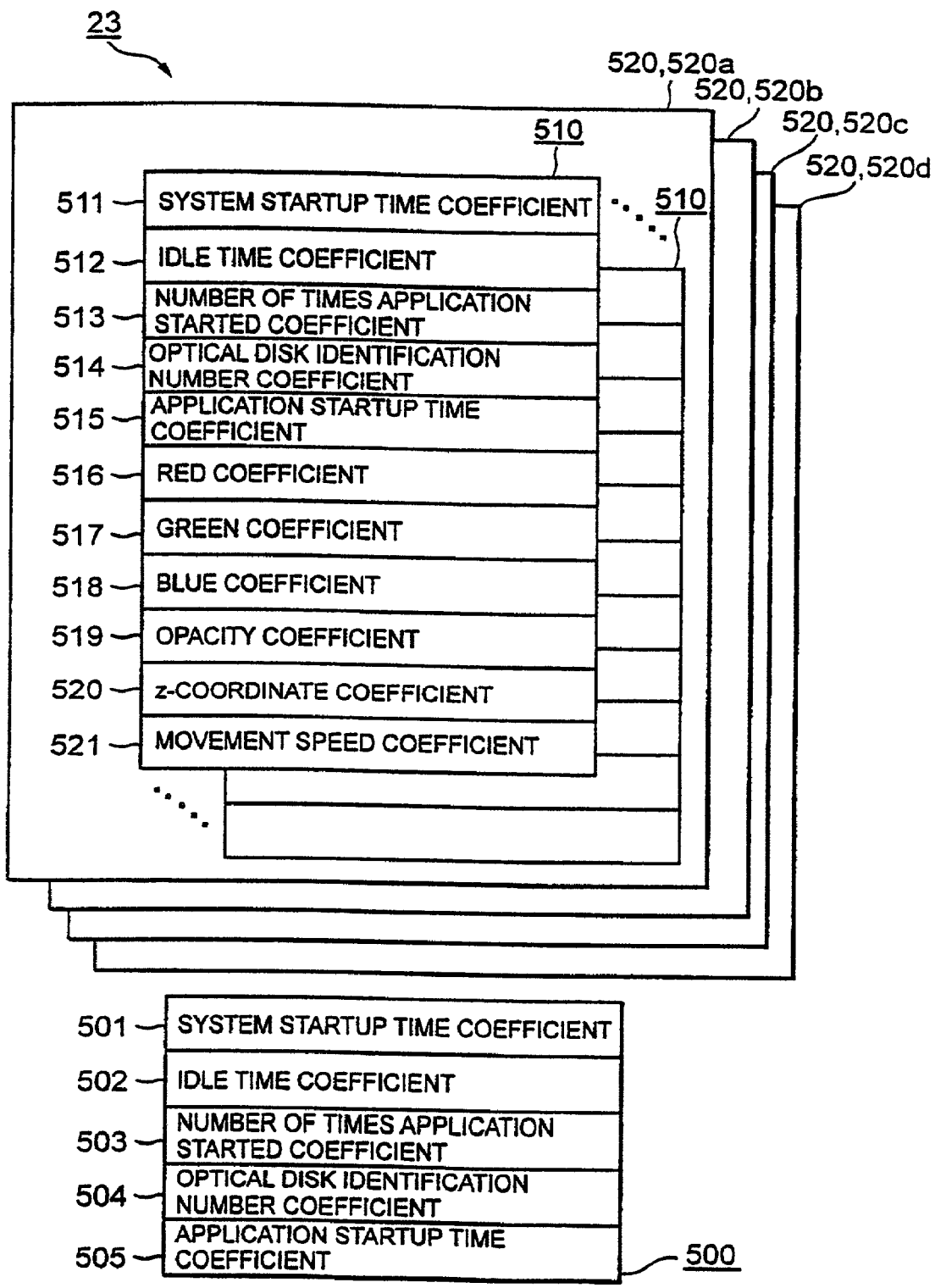
FIG. 5 diagrammatically shows an example of the data structure of the coefficient storage block.

The coefficient storage block 23 is a storage area for holding various coefficients for calculating display information using the values held in the historical information storage block 24 and display information storage block 25, and as shown in FIG. 5, it includes a number displayed calculation coefficient storage area 500 and a display data calculation coefficient storage area 520.

The number displayed calculation coefficient storage area 500 has a system startup time coefficient storage area 501, an idle time coefficient storage area 502, a coefficient for the number of times the application started storage area 503, a coefficient for the optical disk identification number storage area 504, and a coefficient for the application startup time storage area 505.

In addition, there are four types of display data calculation coefficient storage areas 520: the z-coordinate calculation coefficient storage area 520a, the display color calculation coefficient storage area 520b, the opacity calculation coefficient storage area 520c and the movement speed calculation coefficient storage area 520d, where each of the individual display data calculation coefficient storage areas 520 is provided with a total of 80 object identification storage areas 510, one each corresponding to the 80 objects.

Each of the individual display data calculation coefficient storage areas 520 includes a system startup time coefficient storage area 511, an idle time coefficient storage area 512, a coefficient for the number of times the application started storage area 513, a coefficient for the optical disk identification number storage area 514, a coefficient for the application startup time storage area 515, a coefficient for the display color (red) storage area 516, a coefficient for the display color (green) storage area 517, a coefficient for the display color (blue) storage area 518, a coefficient for the opacity storage area 519, a coefficient for the display position (z-coordinate) storage area 520, and a coefficient for movement speed storage area 521.

In this embodiment, these coefficients are set such that the number of cubes 31 displayed increases, the opacity decreases, the brightness increases and the z-coordinate gets closer to 0 as the historical information accumulates, with the coefficients being held in advance in the various storage areas 501–505 and 511–521. The value of these various coefficients may be found experimentally depending on the image and design one wishes to project.

While the various coefficients are held in advance in tables in order to shorten the time required for the calculation process in this working example, the coefficients may also be calculated based on some function.

(3) Historical Information Storage Block 24

As shown in FIG. 2, the historical information storage block 24 includes a startup information storage block 241 for holding information about the starting time and the like, and an optical disk information storage block 242 for holding information regarding the optical disk loaded in the optical disk drive 81.

a. Startup Information Storage Block 241

Figure 6:
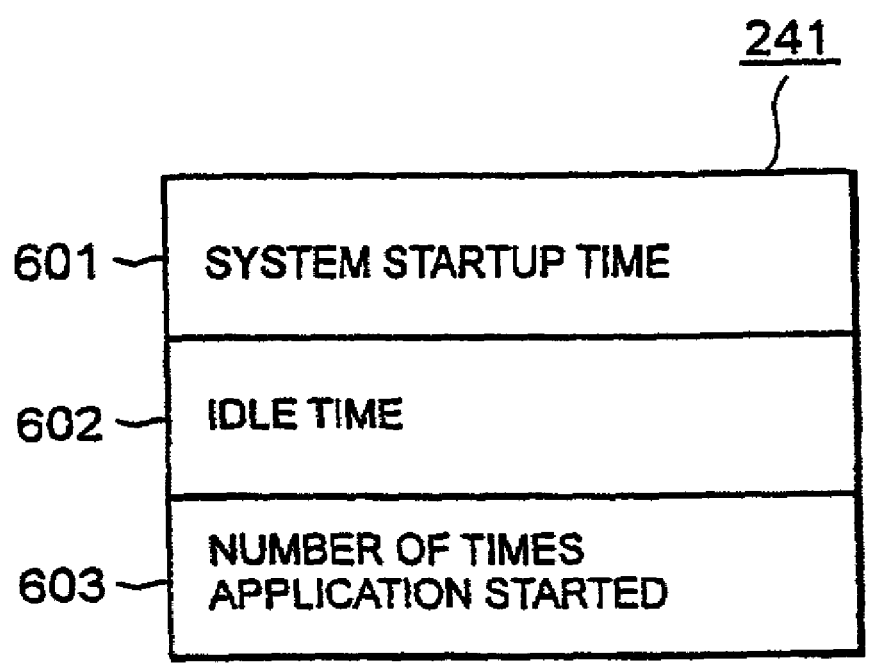
FIG. 6 is a schematic diagram showing an example of the data structure of the startup information storage block.

As shown in FIG. 6, the startup information storage block 241 includes a system startup time (date and time when the power was first turned on to the system and the time was set) storage area 601, idle time (time with the power turned on but no game program is being executed) storage area 602 and application program startup time storage area 603. The initial values of each of these storage areas 601–603 is 0.

b. Optical Disk Information Storage Block 242

Figure 7:
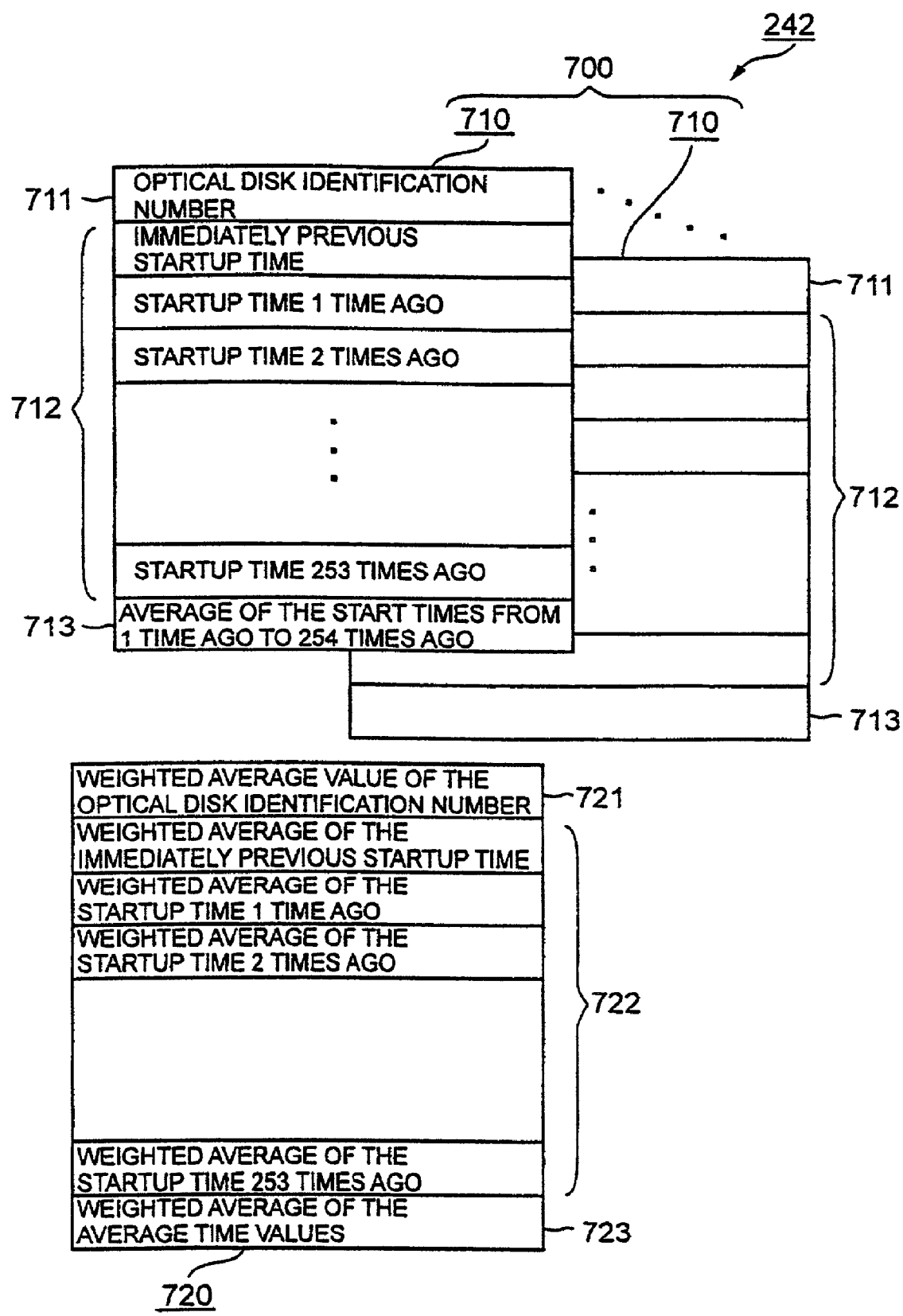
FIG. 7 is a schematic diagram showing an example of the data structure of the optical disk information storage block.

As shown in FIG. 7, the optical disk information storage block 242 includes a group of individual optical disk information storage areas 700 for holding information on optical disks from the first one to the $255^{th}$ one, and an average value information storage area 720 for holding information on the $256^{th}$ and subsequent optical disks.

The individual optical disk information storage areas 700 contain 255 optical disk information storage areas 710 that hold information on each individual optical disk. containing information on the $1^{st}$ through $255^{th}$ optical disk counting from the first one in the order of the most recent starting time of the application that had last started using that disk.

Each of the optical disk information storage areas 710 includes a storage area 711 for the identification number of the optical disk, a storage area 712 for the startup time of the application (game, CD player or DVD player) that used the optical disk in question from the immediately previous time to 253 times ago, and a storage area 713 for holding the average value of the startup time of the application that used the optical disk in question prior to the $254^{th}$ time ago.

The average value information storage area 720 is a storage area for holding the average values of information on the optical disks from the most recent one to the $256^{th}$ one ago in the order of the most recent time when the application that used the disk in question was last started up, having a storage area 721 for holding weighted average values for each of the digits of the identification numbers of individual optical disks after the $256^{th}$ (average values weighted by the number of times the application that uses that disk had been started), a storage area 722 for holding the weighted average values of the application startup time for individual optical disks after the $256^{th}$ and a storage area 723 for holding the weighted average values of the average value of the starting time of the application that uses that disk prior to the $254^{th}$ time of each optical disk after the $256^{th}$ disk.

In this embodiment, the weighted average values used are average values weighted based on the number of times the application that uses the disk had been started, but the average values may also be calculated without weighting. In addition, the optical disk identification number used may be the ISRC (International Standard Recording Code) number or a value found by sampling a specific area of the disk, but this is not a limitation as long as the disk can be identified.

E. Flow of Processing

In the entertainment system 1 of this embodiment, when the power is turned on, the operation control block 21 is first started.

(1) Processing of the Operation Control Block 21

Figure 8:
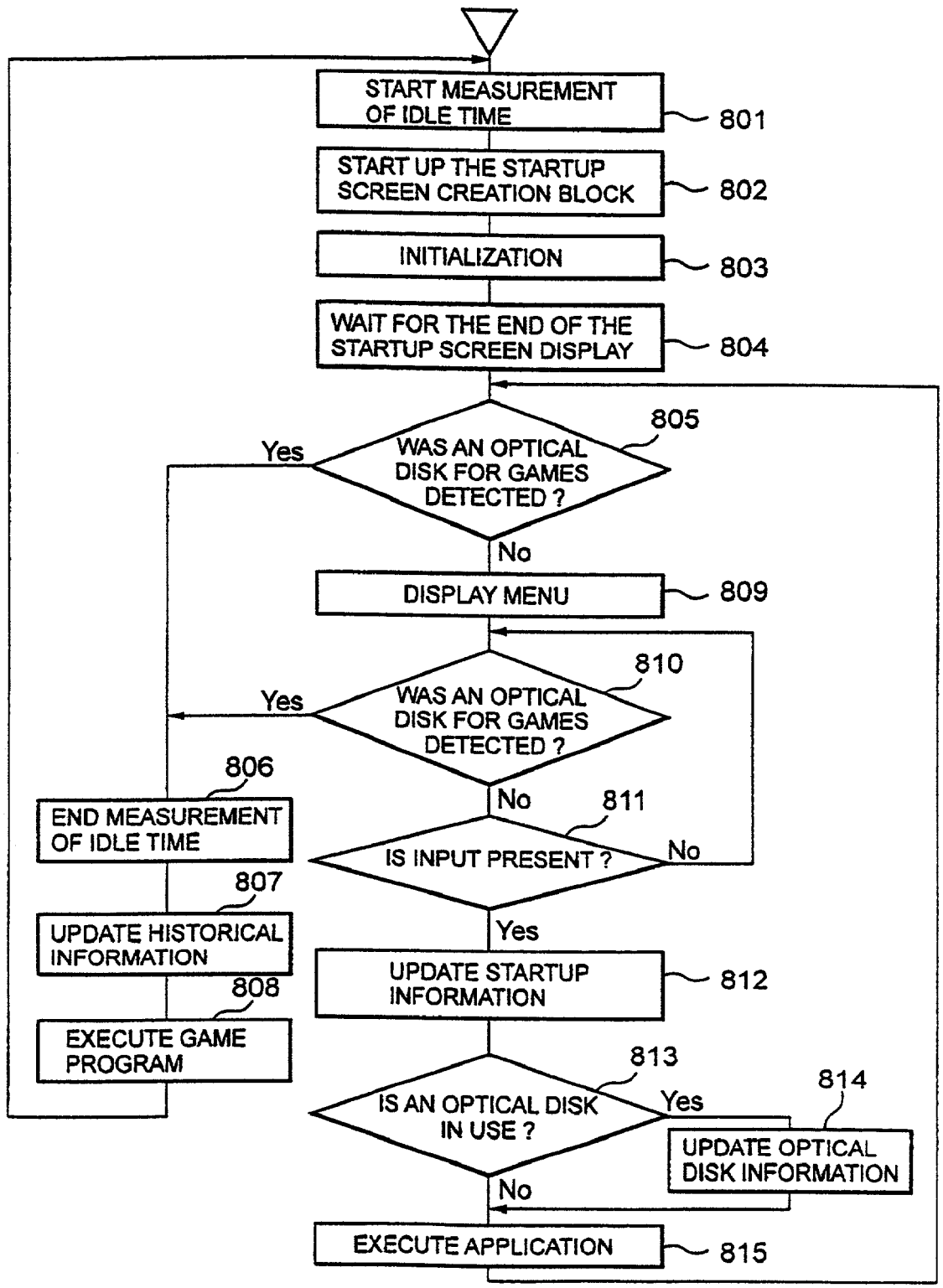
FIG. 8 is a flowchart showing the processing of the operation controller of the system of the present invention.

As shown in FIG. 8, the operation control block 21 first starts measuring the idle time (Step 801), starts up the startup screen creation block 22 and then (Step 802), performs the self-test and stipulated initialization processing (Step 803), and then waits for the display of the startup screen 33 to end (Step 804).

When the display of the startup screen 33 ends, the operation control block 21 determines whether or not an optical disk for a game is loaded in the optical disk drive 81 of the optical disk controller 80 (Step 805), and if so, stops measuring the idle time and stores the measured idle time in the idle time storage area 602 of the startup information storage block 241 (Step 806), updates the historical information (Step 807), and executes the program for the game by means of the game execution block 20 (Step 808), and when the game is over, processing returns to Step 801.

The updating of the historical information in Step 807 is performed as follows. In Step 807, first the operation control block 21 increments by 1 the value held in the application program startup time storage area 603 of the startup information storage block 241, detects the identification number of the loaded optical disk, determines whether or not an optical disk with the same identification number is registered in the group of individual optical disk information storage areas 700, and if registered, the application startup time recording area 712 of the optical disk information storage area 710 corresponding to the optical disk having that identification number is shifted by one at a time, recalculating the average values for the $254^{th}$ time and before if necessary, and then the current time is registered in the application startup time recording area 712 as the most recent application startup time. In addition, if the loaded optical disk is not yet registered in the group of individual optical disk information storage areas 700, then the operation control block 21 recalculates the value of the average value information storage area 720 if necessary, and then creates and registers an optical disk information storage area 710 for the loaded optical disk. At this time, the current time is stored in the application startup time recording area 712 as the most recent application startup time.

The game execution block 20 started in Step 808 reads the program for a game held by the optical disk in question via the optical disk controller 80, and depending on the input received via the communications controller 90, executes the program in question while controlling the operation of the image controller 60 and sound controller 70.

If an optical disk for a game is not loaded in Step 805, the operation control block 21 outputs image drawing data via the image controller 60 so that a display screen menu is displayed and then receives input of menu selections (Step 809).

Here, if the operation control block 21 detects that an optical disk for a game is loaded in the optical disk drive 81 of the optical disk controller 80 (Step 810), then processing proceeds to the aforementioned step 806.

If an optical disk for a game is found not to be loaded in Step 810, then upon receiving input of menu selections (Step 811), the operation control block 21 increments by 1 the value held in the application program startup time storage area 603 of the startup information storage block 241 (Step 812), and if the selected application is one that uses an optical disk (namely a CD player or DVD player), then the optical disk information storage block 242 is updated in the same manner as in Step 807 (Step 814). and the selected application is executed (Step 815) and then processing returns to Step 805.

At the time of startup when the power is first turned on, the operation control block 21 stores the time when the time is set in the system startup time storage area 601 of the startup information storage block 241. This process is not performed the second and subsequent times that the power is turned on.

In this embodiment, even if an application that does not use an optical disk, such as a utility program from a memory card is started, the value held in the application program startup time storage area 603 is incremented by 1, but the incrementing may also be performed only in the case of an application that uses an optical disk.

(2) Processing of the startup screen creation block 22

Figure 9:
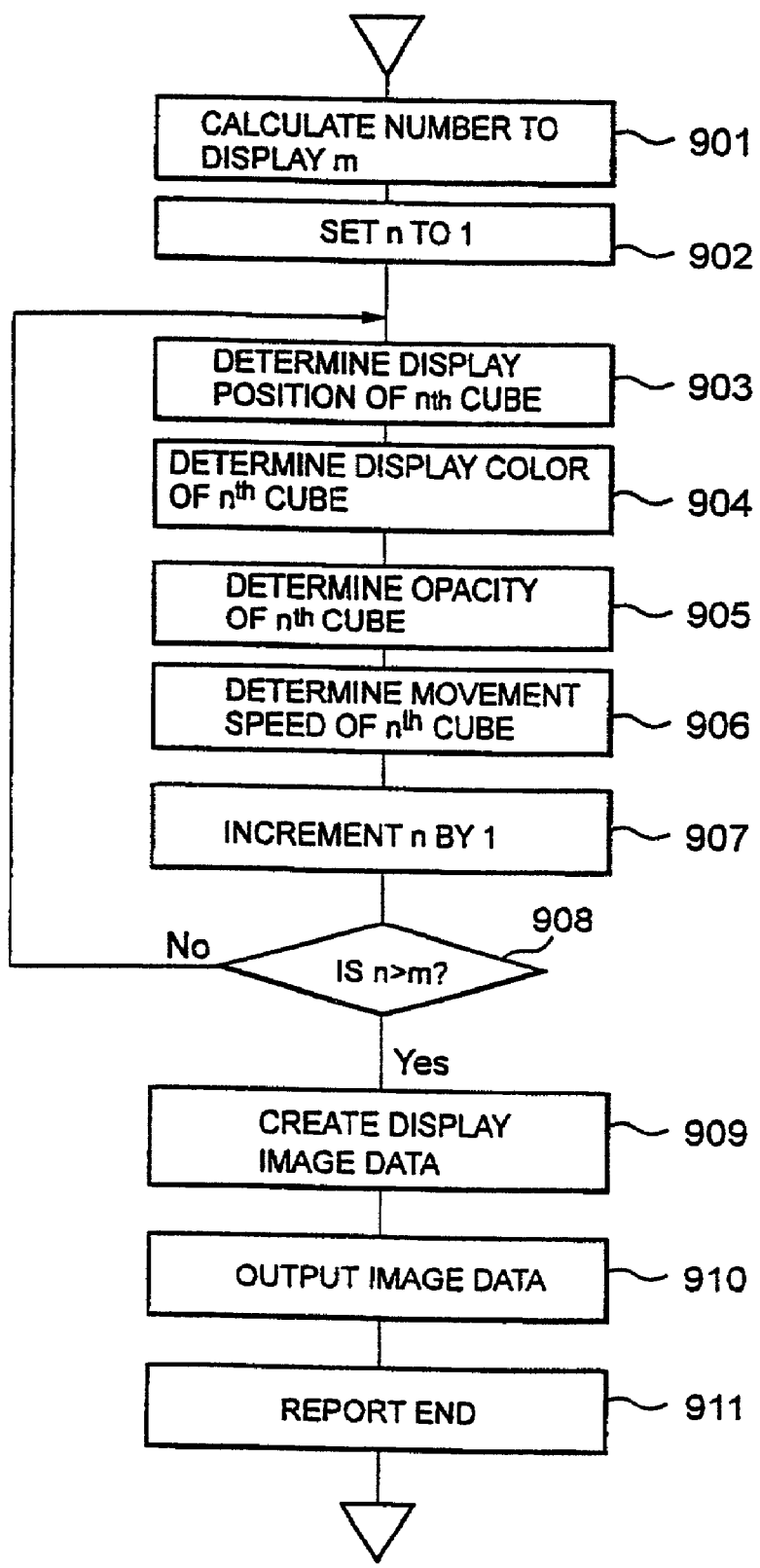

As shown in FIG. 9, the startup screen creation block 22 started by the operation control block 21 in Step 802 first calculates the number m of objects (cubes) 31 to be displayed and stores this in the number displayed storage area 40 of the display information storage block 25 (Step 901), sets the loop counter n to 1 (Step 902), and for the $n^{th}$ object 31, calculates its display position (Step 903), display color (Step 904), opacity (Step 905), movement speed (Step 906), and stores the values thus obtained in areas 425–430 of the object information storage area 42 corresponding to object number n, increments n by 1 (Step 907) and compares n against the number to be displayed m (Step 908).

If n is not greater than m in Step 908, then the startup screen creation block 22 returns processing to Step 903 and calculates the display data for the next object.

If n is greater than m in Step 908, then based on the display data for the various objects calculated in the above process, the startup screen creation block 22 directs the image controller 60 to create image drawing data for a moving image consisting of the various objects floating in a three-dimensional virtual space and moving at the calculated speed (Step 909), and after output from the AV output jack 65 (Step 910), reports the end of processing to the operation control block 21 (Step 911).

In order to create the image drawing data in Step 909, for example flat shading, glow shading, texture mapping and other ordinary three-dimensional image creation processes may be used, and there are no particular limits.

Next, the process of calculating the various display data will be described in detail. However, the following is no more than a single example and the present invention is in no way limited thereto.

In the following example, u is the system startup time, read from area 601 of the startup information storage block 241, while v is the idle time, read from storage area 602 of the startup information storage block 241, w is the number of times the application started, read from storage area 603 of the startup information storage block 241, d is the weighted average value for each digit of the optical disk identification number, found as the average value calculated by averaging the values held in the various areas 711 of the optical disk information storage block 242 and the value held in storage area 721, weighted by the number of times the application started, e is the average value of the starting time of the application that uses the optical disk, calculated by averaging the values held in the storage areas 712, 713, 722 and 723 of the optical disk information storage block 242. The values r, g, b, a, z and s are the R component of the display color, G component of the display color, B component of the display color, opacity, z-coordinate and movement speed of the cube which is the object, respectively, being read from the areas 426–430 of the object information storage area 42 corresponding to the object subject to processing of the display information storage block 25.

(1) Number Displayed Calculation Process (Step 901)

In Step 901, first the startup screen creation block 22 calculates M by the following equation (1).

$$M=(\alpha u+\beta v+\gamma w+\delta d+\epsilon e)/5 \qquad (1)$$

The coefficients $\alpha$ through $\epsilon$ are the values read from the areas 501–505 of the number displayed calculation coefficient storage area 500 used for calculating the number displayed provided in the coefficient storage block 23.

Figure 10:
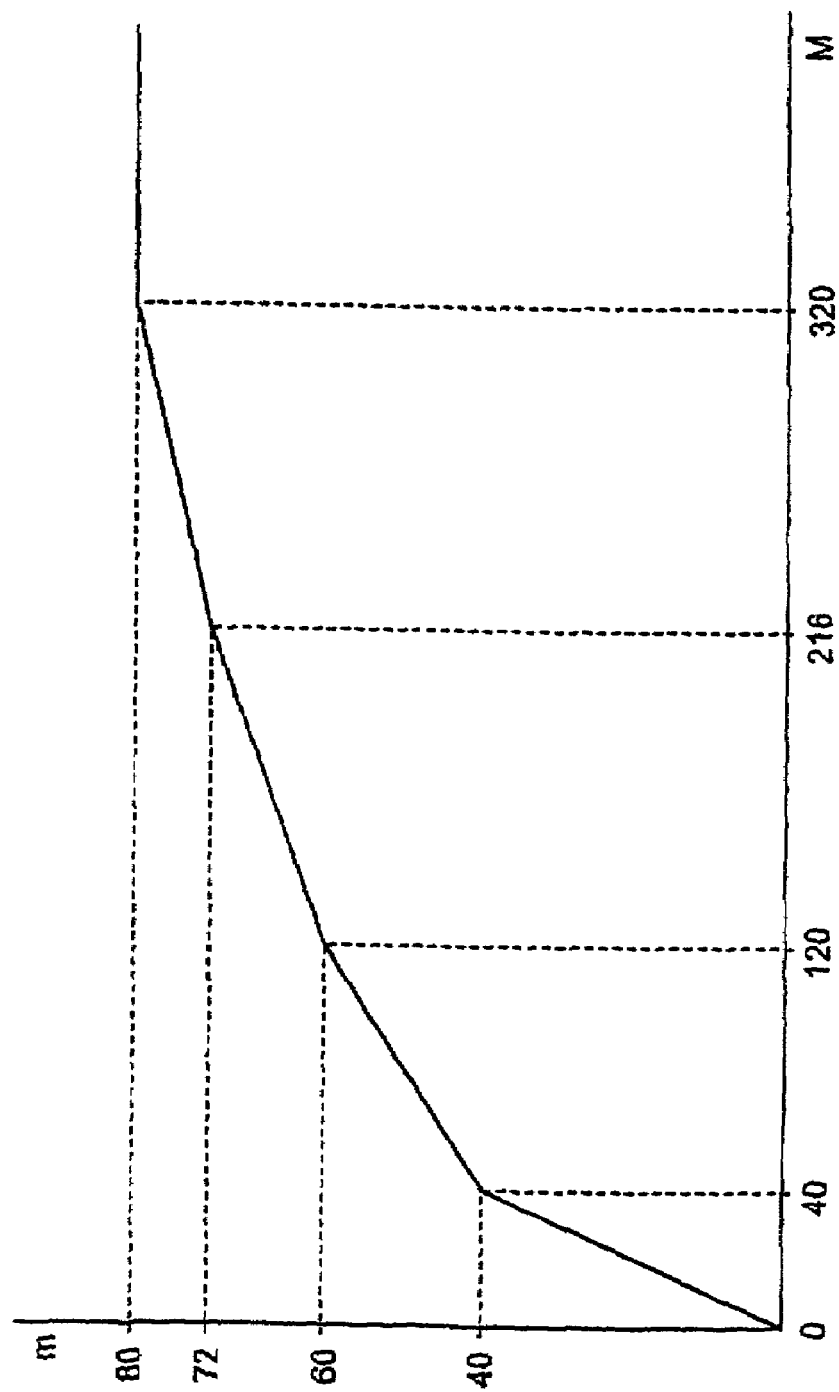
FIG. 10 is a graph showing the transition in the number of objects displayed in the embodiment of the present invention.

Next, the startup screen creation block 22 sets m=M if the M found here is in the range $0 \leq M \leq 40$, or sets m=M/2 if $40 < M \leq 120$, sets m=M/3 if $120 < M \leq 216$, sets m=M/4 if $216 < M \leq 320$, sets m=80 if $320 < M$, and the value m thus found is stored in the number displayed storage area 40 of the display information storage block 25. For this reason, in this embodiment, as shown in the graph of FIG. 10, the number displayed asymptotically approaches the maximum value of 80.

The method of calculating the number displayed m is not limited to this, but rather it may be selected appropriately depending on the content of representation or design. For example, the number displayed in may also be found by the following equation (2). However, u represents the maximum value to be displayed 80, while R indicates the gain parameter set forth appropriately.

$$m=u(1.0-\exp(-M/R)) \qquad (2)$$

(2) Display Position Determination Process (Step 903)

In Step 903, the startup screen creation block 22 first reads the x-coordinate and y-coordinate of the display position of the object in question from areas 423 and 424 of the object information storage area 42 corresponding to the object number n of the display information storage block 25. Next, the startup screen creation block 22 calculates the new z-coordinate Z by equation (3) and stores it in area 425 of the object information storage area 42.

$$Z=(\alpha u+\beta v+\gamma w+\delta d+\epsilon e+\zeta r+\eta g+\theta b+\iota a+\kappa z+\lambda s)/11 \qquad (3)$$

The coefficients $\alpha$ through $\lambda$ are the values read from the areas 511–521 of the area 510 corresponding to the $n^{th}$ object among the object identification storage areas 510 of the z-coordinate calculation coefficient storage area 520a provided in the coefficient storage block 23.

(3) Display Color Determination Process (Step 904)

In Step 904, the startup screen creation block 22 calculates the new component values R, G and B by equations (4)–(6) below and stores them in areas 426–428 of the object information storage area 42 corresponding to object number n.

$$R=(\alpha u+\beta v+\gamma w+\delta d+\epsilon e+2\zeta r+\eta g+\theta b+\iota a+\kappa z+\lambda s)/12 \qquad (4)$$

$$G=(\alpha u+\beta v+\gamma w+\delta d+\epsilon e+\zeta r+2\eta g+\theta b+\iota a+\kappa z+\lambda s)/12 \qquad (5)$$

$$B=(\alpha u+\beta v+\gamma w+\delta d+\epsilon e+\zeta r+\eta g+2\theta b+\iota a+\kappa z+\lambda s)/12 \qquad (6)$$

The coefficients $\gamma$ through $\lambda$ are the values read from the areas 511–521 of the area 510 corresponding to the $n^{th}$ object among the object identification storage areas 510 of the display color calculation coefficient storage area 520b provided in the coefficient storage block 23.

(4) Opacity Determination Process (Step 905)

In Step 905, the startup screen creation block 22 calculates the new opacity A by equation (7) below and stores it in area 429 of the object information storage area 42 corresponding to object number n.

$$A=(\alpha u+\beta v+\gamma w+\delta d+\epsilon e+\zeta r+\eta g+\theta b+\iota a+\kappa z+\lambda s)/11 \qquad (7)$$

The coefficients $\alpha$ through $\lambda$ are the values read from the areas 511–521 of the area 510 corresponding to the $n^{th}$ object among the object identification storage areas 510 of the opacity calculation coefficient storage area 520c provided in the coefficient storage block 23.

(5) Movement Speed Determination Process (Step 906)

In Step 906, the startup screen creation block 22 calculates the new opacity S by equation (8) below and stores it in area 430 of the object information storage area 42 corresponding to object number n.

$$S=(\alpha u+\beta v+\gamma w+\delta d+\epsilon e+2\zeta r+\eta g+\theta b+\iota a+\kappa z+\lambda s)/12 \qquad (8)$$

The coefficients $\alpha$ through $\lambda$ are the values read from the areas 511–521 of the area 510 corresponding to the $n^{th}$ object among the object identification storage areas 510 of the movement speed calculation coefficient storage area 520d provided in the coefficient storage block 23.

F. Effects of this Embodiment

By means of this embodiment, it is possible to display a startup screen that, while having an unexpected character, allows its regularity to be discovered by experience, stimulating the inquisitive nature of the user and thus does not become boring. In addition, since the history of operation will be essentially different for each individual system, by means of the present invention, it is possible to display a startup screen that will be different for each individual system.

In this embodiment, the various display data are calculated by means of complex calculations using a large number of parameters. Therefore, the user will not be able to easily find the relationship between the parameters and the display, and thus the display will vary with unexpected character. Yet as a certain amount of experience is accumulated, the presence of a general relationship between the parameters and display may be found, so the inquisitive nature of the user can be stimulated.

The afore-described embodiment suggested only the creation of a startup screen, but it is also possible to create and generate sound data at the same time. In such a case, the sound data may be predetermined or it may be varied based on historical information or the like in the same manner as the image drawing data.

In addition, while in the embodiment described, the displayed objects move within the display screen at a movement speed set individually, the present invention is in no way limited to this, as the displayed objects may not move or they may execute other predetermined motions (e.g., rotation or the like). In the event that the displayed objects do not move, there is no need to calculate the movement speed, so it is possible to omit the movement speed storage area 430 of the display information storage block 25, the coefficient for movement speed storage area 521 of the coefficient storage block 23 and the movement speed determination process (906) of the startup screen creation block 22.

With the information processing system and entertainment system of the present invention, it is possible to display a startup screen that has variety and unexpected character. By means of the present invention, the displayed content of the startup screen changes gradually each time the system is started, so it will not become boring even after being started many times.

What is claimed is:

1. An entertainment system comprising:
   a startup screen generated after the power is turned on and during an initialization process of said entertainment system but prior to user interaction with said entertainment system, the initialization process comprising a period of loading the basic input/output system and a period of loading the operating system, and
   a startup screen creation block that creates and displays image drawing data for a moving image for the startup screen each time said entertainment system is started,
   wherein said image drawing data varies with each start of said entertainment system,
   wherein said startup screen creation block performs said creation of image drawing data based on accumulated historical information,
   wherein said startup screen creation block calculates, based on said historical information, at least one element selected from the group consisting of a number of drawn objects to be displayed on the startup screen, display positions, display colors and opacity of the drawn objects, and uses the results of calculation to create said image drawing data,
   wherein said startup screen creation block includes means of calculating information for drawing said startup screen by adding a plurality of pieces of said historical data, each multiplied by a predetermined coefficient, and
   wherein the entertainment system further comprises a storage area for holding coefficients used in multiplication in advance.

2. The entertainment system according to claim 1, wherein
   said historical information includes at least one element selected from the group consisting of system startup time, an idle time during which no game is executed, the number of times an application is started, an identification number of an optical disk used in the entertainment system and an application startup time.

3. The entertainment system according to claim 1, wherein
   said startup screen creation block includes means calculating display data for drawn objects to be displayed on the startup screen based on said historical data, and said drawn objects are three-dimensional objects.

4. The entertainment system according to claim 1, and further comprising
   a communications controller, and wherein
   said historical information is held on external storage media connected to the entertainment system via said communications controller.

5. The entertainment system according to claim 1, and further comprising
   a rewritable built-in internal storage media, and wherein said historical information is held on said built-in internal storage media.

6. An entertainment system comprising:
   an operation controller, a startup screen creator, a game execution block; a historical information storage block; a central processing unit, a storage system, a coefficient storage block, a display information storage block, and an image controller provided with an image processing unit, wherein:
   said central processing unit implements contents of said operation controller that controls the operation of the entire entertainment system, said startup screen creator that creates a startup screen and outputs image drawing for data a moving image via said image controller after power is turned on to said entertainment system and during an initialization process of said entertainment system but prior to user interaction with said entertainment system, and the game execution block that executes a game program, by programs for each stored in said storage system, the initialization process comprising a period of loading the basic input/output system and a period of loading the operating system,
   said storage system further holds historical information in said historical information storage block, where said information is used at the time of creation of image drawing data for the startup screen by said startup screen creator,
   said startup screen creator varies the image drawing data with each start of said entertainment system based on said historical information,
   said storage system further holds information used at the time of creation of image drawing data for the startup screen by said startup screen creator, consisting of at least various coefficients to be applied to said historical information held in said coefficient storage block, and data used for display of the startup screen held in said display information storage block,
   said coefficient storage block stores display information calculation coefficients consisting of coefficients used for calculating the number to be displayed and coefficients for calculating display data, and
   said coefficients for calculating display data consist of various coefficients, grouped by each of several objects, for the z-coordinate, display color, opacity and movement speed of the objects.

7. The entertainment system according to claim 6, wherein
   said display information storage block stores at least one of elements selected from the group consisting of the number of objects to be displayed on the startup screen, along with identifiers corresponding to the objects, whether or not to display the objects, display positions, display colors, opacity and movement speed of the objects.

8. The entertainment system according to claim 6, wherein said coefficients used for calculating the number to be displayed consist of various coefficients for the entertainment system startup tune, idle time, number of times an application started, optical disk identification number and application startup time.

9. The entertainment system according to claim 6, wherein said historical information stored in said historical information storage block contains at least one element selected from the group consisting of a system startup time, an idle time during which no game is executed, the number of times an application is started, the identification number of an optical disk and the application startup time.

10. The entertainment system according to claim 9, wherein said historical information further contains the average value of the number of times an application that uses each optical disk is started.

11. The entertainment system according to claim 10, wherein said average value is a weighted average value weighted by the number of times the application is started.

12. The entertainment system according to claim 6, wherein said operation controller performs the startup of said startup screen creator, updating of said historical information storage block and execution of programs by said game execution block.

13. The entertainment system according to claim 6, wherein said startup screen creator applies various coefficients to historical information from said historical information storage block and stores the results in said display information storage block.

14. The entertainment system according to claim 6, wherein said startup screen creation block calculates, based on said historical information, at least one element selected from the group consisting of the number of drawn objects to be displayed on the startup screen, display positions, display colors and opacity of the objects, and uses the results of calculation to create said image drawing data.

15. The entertainment system according to claim 6, wherein said startup screen creation block comprises means of calculating display data for drawn objects to be displayed on the startup screen based on said historical data, and said drawn objects are three-dimensional objects.

16. The entertainment system according to claim 13, wherein said various coefficients in said coefficient storage block are held in advance in a table.

17. The entertainment system according to claim 6, wherein said historical information is held on external storage media connected via a communications controller.

18. The entertainment system according to claim 6, wherein said historical information is held on a built-in internal storage media.

19. An information processing system comprising a startup screen, and a startup screen creation block that creates and displays image drawing data for a moving image for said startup screen each time it is started, the image drawing being displayed during an initialization process comprising a period of loading the basic input/output system and a period of loading the operating system;

wherein said startup screen creation block performs said creation of image drawing data for a moving image based on accumulated historical information, wherein said startup screen creation block calculates, based on said historical information, at least one element selected from the group consisting of a number of drawn objects to be displayed on the startup screen, display positions, display colors and opacity of the drawn objects, and uses the results of calculation to create said image drawing data, wherein said startup screen creation block includes means of calculating information for drawing said startup screen by adding a plurality of pieces of said historical data, each multiplied by a predetermined coefficient, and wherein the entertainment system further comprises a storage area for holding coefficients used in multiplication in advance.

20. An information processing system comprising:

a central processing unit; a storage system; image controller provided with an image processing unit, an operation controller a startup screen creator; a game execution block; a coefficient storage block; a display information storage block; and a historical information storage block, wherein said central processing unit implements contents of said operation controller that controls the operation of the entire processing system, and said startup screen creator that creates a startup screen and outputs image drawing data for a moving image via said image controller after power is turned on to said information processing system and during an initialization process of said information processing system but prior to user interaction with said information processing system, by programs for each stored in said storage system, the initialization process comprising a period of loading the basic input/output system and a period of loading the operating system, said storage system further holds historical information in said historical information storage block, where said information is used at the time of creation of image drawing data for the startup screen by said startup screen creator, said startup screen creator varies the image drawing data with each start of said information processing system based on said historical information, said storage system further holds information used at the time of creation of image drawing data for the startup screen by said startup screen creator, consisting of at least various coefficients to be applied to said historical information held in said coefficient storage block, and data used for display of the startup screen held in said display information storage block, said coefficient storage block stores display information calculation coefficients consisting of coefficients used for calculating the number to be displayed and coefficients for calculating display data, and said coefficients for calculating display data consist of various coefficients, grouped by each of several objects, for the z-coordinate, display color, opacity and movement speed of the objects.

21. The information processing system according to claim 19, wherein said display information storage block stores at least one of elements selected from the group consisting of the number of objects to be displayed on the startup screen, along with identifiers corresponding to the objects, whether or not to display the objects, and display positions, display colors, opacity and movement speed of the objects.

22. The information processing system according to claim 19, wherein said coefficient storage block stores display information calculation coefficients consisting of coefficients used for calculating the number to be displayed and coefficients for calculating display data.

23. The information processing system according to claim 22, wherein said coefficients used for calculating the number to be displayed consist of various coefficients for the system startup time, idle time, number of times the application started, optical disk identification number and application startup time.

24. The information processing system according to claim 22, wherein said coefficients for calculating display data consist of various coefficients, grouped by each of several objects, for the z-coordinate, display color, opacity and movement speed.

25. The information processing system according to claim 20, said historical information stored in said historical information storage block contains at least one element selected from the group consisting of a system startup time, an idle time, the number of times an application is started, an identification number of an optical disk and the application startup time.

26. The information processing system according to claim 25, wherein said historical information further contains the average value of the number of times an application that uses each optical disk is started.

27. The information processing system according to claim 26, wherein said average value is a weighted average value weighted by the number of times the application is started.

28. The information processing system according to claim 20, wherein said operation controller performs the startup of said startup screen creator, updating of said historical information storage block and execution of programs by said game execution block.

29. The information processing system according to claim 20, wherein said startup screen creator applies various coefficients to historical information from said historical information storage block and stores the results in said display information storage block.

30. The information processing system according to claim 20, wherein said startup screen creation block calculates, based on said historical information, at least one element selected from the group consisting of: the number of drawn objects to be displayed on the startup screen, their display positions, display colors and opacity of the drawn objects, and uses the results of this calculation to create said image drawing data.

31. The information processing system according to claim 20, wherein said startup screen creation block comprises means of calculating display data for drawn objects to be displayed on the startup screen based on said historical data, and said drawn objects are three-dimensional objects.

32. The information processing system according to claim 29, wherein various coefficients in said coefficient storage block are held in advance in a table.

33. The information processing system according to claim 20, wherein said historical information is held on external storage media connected to the information processing system via a communications controller.

34. The information processing system according to claim 20, wherein, said historical information is held on a built-in internal storage media.

35. A startup screen display method for starting a startup screen of an information processing system, comprising the steps of:
generating a startup screen after the power is turned on and during an initialization process of said information processing system but prior to user interaction with said information processing system, the initialization process comprising a period of loading the basic input/output system and a period of loading the operating system, and
creating image drawing data for a moving image for said startup screen each time the startup screen is started based on accumulated historical information,
wherein said image drawing data varies with each start of said information processing system,
wherein said startup screen is generated based on said historical information, at least one element selected from the group consisting of a number of drawn objects to be displayed on the startup screen, display positions, display colors and opacity of the drawn objects, and uses the results of calculation to create said image drawing data,
wherein said startup screen creation block includes means of calculating information for drawing said startup screen by adding a plurality of pieces of said historical data, each multiplied by a predetermined coefficient, and
wherein the entertainment system further comprises a storage area for holding coefficients used in multiplication in advance.

36. A startup screen display method for an information processing system in which information from a storage system is processed by a central processing unit and displayed by a display device via an image controller provided with an image processing unit, the method comprising the steps of:
implementing by said central processing unit implementing contents of an operation controller that controls the operation of the entire information processing system, and a startup screen creator that creates a startup screen and outputs image drawing data for a moving image after power is turned on to said information processing system and during an initialization process of said information processing system but prior to user interaction with said information processing system, by programs for each stored in said storage system, the initialization process comprising a period of loading the basic input/output system and a period of loading the operating system, and
using historical information held in a historical information storage block of said storage system as information used at the time of creation of image drawing data for the startup screen by said startup screen creator, and thus displaying a startup screen via said image controller that varies with each start of said information processing system based on said historical information;
wherein said storage system further holds information used at the time of creation of image drawing data for the startup screen by said startup screen creator, consisting of at least various coefficients to be applied to said historical information held in a coefficient storage block, and data used for display of the startup screen held in a display information storage block,
said coefficient storage block stores display information calculation coefficients consisting of coefficients used for calculating the number to be displayed and coefficients for calculating display data, and
said coefficients for calculating display data consist of various coefficients, grouped by each of several objects, for the z-coordinate, display color, opacity and movement speed of the objects.

37. The startup screen display method according to claim 36, wherein
said display information storage block stores at least one of elements selected from the group consisting of: the number of objects to be displayed on the startup screen, along with identifiers corresponding to objects, whether or not to display the objects and, display positions, display colors, opacity and movement speed of the objects.

38. The startup screen display method according to claim 36, wherein said coefficient storage block stores display information calculation coefficients consisting of coefficients used for calculating the number to be displayed and coefficients for calculating display data.

39. The startup screen display method according to claim 38, wherein said coefficients used for calculating the number to be displayed consist of various coefficients for the system startup time, idle time, number of times the application started, optical disk identification number and application startup time.

40. The startup screen display method according to claim 38, wherein said coefficients for calculating display data consist of various coefficients, grouped by each of several objects, for the z-coordinate, and display color, opacity and movement speed of the objects.

41. The startup screen display method according to claim 36, wherein said historical information stored in said historical information storage block contains at least one element selected from the group consisting of: the system startup time, the idle time, the number of times an application is started, the identification number of an optical disk and the application startup time.

42. The startup screen display method according to claim 41, wherein said historical information further contains the average value of the number of times an application that uses each optical disk is started.

43. The startup screen display method according to claim 42, wherein said average value is a weighted average value weighted by the number of times the application is started.

44. The startup screen display method according to claim 36, wherein said operation controller performs the startup of said startup screen creator, updating of said historical information storage block and execution of programs by said game execution block.

45. The startup screen display method according to claim 36, wherein said startup screen creator applies various coefficients to historical information from said historical information storage block and stores the results in said display information storage block.

46. The startup screen display method according to claim 36, wherein said startup screen creation block calculates, based on said historical information, at least one element selected from the group consisting of the number of drawn objects to be displayed on the startup screen, and display positions, display colors and opacity of the objects, and uses the results of this calculation to create said image drawing data.

47. The startup screen display method according to claim 36, wherein said startup screen creation block comprises means of calculating display data for drawn objects to be displayed on the startup screen based on said historical data, and said drawn objects are three-dimensional objects.

48. The startup screen display method according to claim 45, wherein said various coefficients in said coefficient storage block are held in advance in a table.

49. The startup screen display method according to claim 36, wherein said historical information is held on external storage media connected via a communications controller.

50. The startup screen display method according to claim 36, wherein historical information is held on said built-in internal storage media.

51. A machine-readable information storage medium holding a program for implementing a startup screen display method by an information processing system for starting a startup screen comprising the steps of:

creating image drawing data for a moving image, based on accumulated historical information, for said startup screen each time said information processing system is started by powering on said information processing system and during an initialization process of said information processing system but prior to user interaction with said information processing system, the initialization process comprising a period of loading the basic input/output system and a period of loading the operating system, varying said image drawing data created each time said information processing system is started, wherein said startup screen is generated based on said historical information, at least one element selected from the group consisting of a number of drawn objects to be displayed on the startup screen, display positions, display colors and opacity of the drawn objects, and uses the results of calculation to create said image drawing data, wherein said startup screen creation block includes means of calculating information for drawing said startup screen by adding a plurality of pieces of said historical data, each multiplied by a predetermined coefficient, and wherein the entertainment system further comprises a storage area for holding coefficients used in multiplication in advance.

52. An information storage medium for an information processing system in which information from a storage system is processed by a central processing unit to create a startup screen via an image controller provided with an image processing unit after power is turned on to said information processing system and during an initialization process of said information processing system but prior to user interaction with said information processing system, the information storage medium serving as said storage system, the initialization process comprising a period of loading the basic input/output system and a period of loading the operating system, wherein said information storage medium is recorded with the content of a program containing an operation controller that controls the operation of the entire information processing system, and the content of a program containing a startup screen creator that creates a startup screen and outputs image drawing data for a moving image, wherein said image drawing data varies with each start of said information processing system, wherein said information storage medium is recorded with information used at the time of creation of image drawing data for the startup screen by said startup screen creator, consisting of at least various coefficients to be applied to said historical information held in the coefficient storage block of said storage system, and data used for display of the startup screen held in a display information storage block of said storage system, said coefficient storage block stores display information calculation coefficients consisting of coefficients used for calculating the number to be displayed and coefficients for calculating display data, and said coefficients for calculating display data consist of various coefficients, grouped by each of several objects, for the z-coordinate, display color, opacity and movement speed of the objects.

53. The information storage medium according to claim 52, which further characterized in that it further has said storage system which records the content of a program containing a game execution block that executes a game program.

54. The information storage medium according to claim 52, wherein said display information storage block stores at least one of the elements selected from the group consisting of: the number of objects to be displayed on the startup screen, along with identifiers corresponding to objects, whether or not to display the objects, and display positions, display colors, opacity and movement speed of the objects.

55. The information storage medium according to claim 52, wherein said coefficient storage block stores display information calculation coefficients consisting of coefficients used for calculating the number to be displayed and coefficients for calculating display data.

56. The information storage medium according to claim 55, wherein said coefficients used for calculating the number to be displayed consist of various coefficients for the system startup time, idle time, number of times the application started, optical disk identification number and application startup time.

57. The information storage medium according to claim 55, wherein said coefficients for calculating display data consist of various coefficients, grouped by each of several objects, for the z-coordinate, display color, opacity and movement speed of the objects.

58. The information storage medium according to claim 52, wherein said historical information stored in said historical information storage block contains at least one element selected from the group consisting of: the system startup time, the idle time, the number of times an application is started, the identification number of an optical disk and the application startup time.

59. The information storage medium according to claim 58, wherein said historical information further comprises the average value of the number of times an application that uses each optical disk is started.

60. The information storage medium according to claim 59, wherein said average value is a weighted average value weighted by the number of times the application is started.

61. The information storage medium according to claim 52, wherein operation controller performs the startup of said startup screen creator, updating of said historical information storage block and execution of programs by said game execution block.

62. The information storage medium according to claim 52, which has a program wherein said startup screen creator applies various coefficients to historical information from said historical information storage block and stores the results in said display information storage block.

63. The information storage medium according to claim 52, which has a program wherein said startup screen creation block calculates, based on said historical information, at least one element selected from the group consisting of the number of drawn objects to be displayed on the startup screen, and display positions, display colors and opacity of the objects, and uses the results of this calculation to create said image drawing data.

64. The information storage medium according to claim 62, wherein said various coefficients in said coefficient storage block are held in advance in a table.

* * * * *